(12) United States Patent
Okada

(10) Patent No.: US 7,272,263 B2
(45) Date of Patent: Sep. 18, 2007

(54) IMAGE DECODING WITH A SIMPLIFIED PROCESS

(75) Inventor: Shigeyuki Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 614 days.

(21) Appl. No.: 10/076,987

(22) Filed: Feb. 14, 2002

(65) Prior Publication Data

US 2002/0154823 A1    Oct. 24, 2002

(30) Foreign Application Priority Data

Feb. 20, 2001    (JP)    ............................. 2001-044005

(51) Int. Cl.
G06K 9/36    (2006.01)
(52) U.S. Cl. .................. 382/233; 382/236; 382/240; 382/250; 382/251; 382/260; 375/240; 375/240.01; 375/240.2; 375/240.27
(58) Field of Classification Search ................ 382/233, 382/236, 244–246, 248, 250, 251, 240, 260, 382/276; 375/240, 240.01, 240.05, 240.28, 375/240.25, 240.24, 240.02, 240.16, 240.15; 348/515, 567; 386/110, 96, 101, 111; 714/784, 714/774, 780
See application file for complete search history.

(56) References Cited

U.S. PATENT DOCUMENTS 5,614,952 A * 3/1997 Boyce et al. .......... 375/240.01
5,815,634 A * 9/1998 Daum et al. ................... 386/96
5,952,943 A * 9/1999 Walsh et al. .................. 341/50
6,008,853 A * 12/1999 Narayan et al. ........ 375/240.24
6,070,195 A * 5/2000 Yamamoto .................. 709/247
6,650,787 B1 * 11/2003 Takahashi et al. .......... 382/251
6,693,961 B1 * 2/2004 Azadegan .............. 375/240.11

FOREIGN PATENT DOCUMENTS

| EP | 0 910 219 A2 | 4/1999 |
|---|---|---|
| EP | 1 148 731 A1 | 10/2001 |
| JP | 10-200860 A | 7/1998 |
| JP | 10-210483 A | 8/1998 |
| JP | 11-225337 A | 8/1999 |

OTHER PUBLICATIONS

Christopoulos, C., et al., "The JPEG2000 Still Image Coding System: An Overview," *IEEE Transactions on Consumer Electronics* 46(4):1103-1127, Nov. 2000.

(Continued)

*Primary Examiner*—Sanjiv Shah
*Assistant Examiner*—Ali A. B Bayat
(74) *Attorney, Agent, or Firm*—McDermott Will & Emery LLP

(57) ABSTRACT

A decoding unit (12) decodes an image according to JPEG 2000. A simplifying unit (30) comprises an automatic transformer (32) which compares an elapsed time to a time limit at each stage of decoding the image and switches the decoding process to a simplified process if necessary. For instance, if the playback of a motion picture takes over 1/30 second, the simplified process, in which only low frequency components are decoded, is conducted by the automatic transformer (32).

24 Claims, 7 Drawing Sheets

OTHER PUBLICATIONS

Mattavelli, M., et al, "Computational Graceful Degradation for Video Sequence Decoding," *Proceedings of the 1997 International Conference on Image Processing*, Santa Barbara, Calif., Oct. 26-29, 1997, pp. 330-333.

Moccagatta, I., and M.Z. Coban, "Computational Complexity Evaluation of JPEG-2000," *Proceedings of SPIE*, vol. 4115, Bellingham, Wash., Jul. 31-Aug. 3, 2000, pp. 521-534.

Taubman, D., et al, "Embedded Block Coding in JPEG2000," *Proceedings of the 2000 International Conference on Image Processing*, Vancouver, B.C., Sep. 10-13, 2000, pp. 33-36.

Wu, G.K., et al., "New Compression Paradigms in JPEG2000," *Proceedings of SPIE*, vol. 4115, Bellingham, Wash., Jul. 31-Aug. 3, 2000, pp. 418-429.

Official Communication issued Sep. 2, 2005, in corresponding European Patent Application No. 02 250 978.0.

* cited by examiner

WI2

IMAGE DECODING WITH A SIMPLIFIED PROCESS

BACKGROUND OF THE INVENTION

1. Field of the Invention

This invention relates to an image decoding technique. This invention especially relates to a method and apparatus for decoding coded image data.

2. Description of the Related Art

In recent years digital image culture has become commonplace in our daily life as various information devices such as personal computers, digital cameras and color printers have been introduced into our homes and the number of Internet users has exploded. Image compression technology such as JPEG (Joint Photographic Expert Group) and MPEG (Motion Picture Expert Group) for still images and motion images respectively has been standardized. Image distribution and reproduction have become easy and convenient for users using recording media such as CD-ROM and transmission media such as networks and broadcasting technology based on the aforementioned image compression technology. JPEG 2000 has been announced in the JPEG line of technology. In MPEG also, future target specifications have been planned and discussed. There is no doubt that image processing technology will soon play an important role in improving the functionality of digital devices.

For instance, recent digital cameras give users access to a convenient function of shooting of motion pictures, and are therefore taking over the original province of video cameras. The number of pixels in CCD or charge-coupled devices is of an order of millions and some cameras have the function of a high-speed continuous shoot. Although some users stick to cameras using film, no one can resist the tide of the digitization which is rising as music records are replaced by compact discs.

However, in order that these devices can be further developed as commercial products, functionality, operability and cost must be considered together. The enhancement of functionality demands high operability and low cost. For instance, if a function for the playback of a motion picture or a function for high-speed continuous shooting is provided with a digital camera, the image data compressed and stored into a memory card and so forth must be retrieved, decoded and enlarged in time for display. For this purpose, a high-speed image decoder must be incorporated into the digital camera and therefore it is likely to be disadvantageous in cost, power consumption and in the size of the implementation.

SUMMARY OF THE INVENTION

The present invention has been made with a view to the above-mentioned problems, and an object thereof is to provide an image decoding technique that is advantageous in cost and power consumption.

Japanese Patent Application Laid-open No. H11-225337 discloses a technology in which a sender of image data breaks off data transmission when appropriate, according to the dispersion of the speed of the transmission path. It is also disclosed therein that a wavelet transform, to which the present invention can be applied, is utilized. This technology is mainly designed not to work when the transmission path is in a normal state. On the other hand, the present invention is independent of the transmission path and aims at cost reduction and so forth on the decoding side.

The objects are achieved by combinations described in the independent claims. The dependent claims define further advantageous and exemplary combinations of the present invention.

According to one aspect of the present invention, a method for decoding a coded image is provided. The method comprises switching an ensuing part of a decoding process to a simplified process whenever the coded image is not completely decoded within a predetermined time. Therefore, without a complicated process or a high-speed process, a certain level of image quality can be maintained and an undesirable playback with frame drop can be prevented. The situation in which the decoding of the coded image is not completed, implies a condition in which, judged from its rate of progress, it is highly probable that the decoding of the image will not be completed within an appropriate time, as well as the situation in which the decoding of the image is not actually completed.

This aspect of the present invention may comprise obtaining the coded image, subjecting the obtained coded image to a decoding process, monitoring an elapsed time of the decoding process, and switching an ensuing part of a decoding process into a simplified process when it is detected that the elapsed time at a checkpoint in the decoding process exceeds a predetermined time limit.

According to another aspect of the present invention, a method for decoding a coded image is provided. The coded image is a motion picture coded on a frame-by-frame basis, and the method comprises switching an ensuing part of a decoding process of any frame included in the coded image to a simplified process whenever the frame is not completely decoded within a predetermined time. The predetermined time may be, for instance, 1/30 second, that is, 30 frames are decoded and played as a motion picture within one second, or 1/5 second, that is, 5 frames are decoded and played as a high-speed continuous picture.

The decoding process of the frame may be divided into a plurality of steps and a time limit may be defined for each of the steps, and when an elapsed time reaches the defined time limit at any one of the steps, the ensuing part of the process of the step may be simplified. The plurality of the steps may comprise the steps for decoding each of the color components or the steps for decoding each of the image regions, for instance, however a given step may be any stage or phase in which the time limit and the elapsed time can be compared.

The coded image may be a motion picture in which the frames are coded independently of each other and the simplified process may be a process confined within each of the frames. In this case, since the simplified process can be conducted on each frame separately, the result obtained does not affect the image quality of another frame.

According to still another aspect of the present invention, an image decoding apparatus is provided. The apparatus comprises a decoding unit which decodes a coded image, and a simplifying unit which switches an ensuing part of a decoding process to a simplified process in such a situation that the coded image is not completely decoded within a predetermined time. The coded image may be a motion picture coded on a frame basis and in this case the simplifying unit may switch the decoding process to the simplified process on the frame basis. The simplifying unit may substitute for the decoding unit by conducting a simplified decoding process by itself, or may simply direct the decoding unit to conduct a simplified process.

The simplifying unit may compare a time limit defined for each of a plurality of frame-decoding steps to an elapsed time at each of the steps, and simplify an ensuing part of the process of any one of the steps during which the elapsed time reaches the time limit. The simplifying unit may conduct the comparison of the time limit and the elapsed time and initiate the simplified process if necessary at each of the steps of decoding each of a plurality of color components which compose the image or decoding each of a plurality of regions which compose the image. The simplified process is not necessary as long as the time limit is not exceeded. However, even in such a case, the simplified process may be conducted for another reason.

The simplifying unit may relax the time limit allocated to a remaining step when any one of the steps is completed earlier than or within its time limit. Macroscopically, the simplifying unit may relax the predetermined time allocated to the next frame to be decoded when the decoding process of any one of the frames is completed earlier. For instance, if the predetermined time is originally 1/30 second and, however, one frame is decoded within 1/60 second, the predetermined time allocated for the next frame may be 1/30+(1/30−1/60)=1/20 second. In this case the playback for every 1/30 second can be realized in time.

The simplifying unit may conduct the simplified process by automatically setting a high frequency component of the image to zero. In the case of the decoding process based on JPEG 2000, the HH sub-band may be regarded as invalid coefficients or all zeros.

The simplifying unit may adjust the resolution of a decoded image, which has a low frequency component as a basic component after the high frequency component is automatically set to zero, when the decoded image does not have a certain predetermined level of resolution. In the case of decoding based on JPEG 2000, if only the LL sub-band is decoded within the predetermined time, the image size or the resolution is just one-fourth the size of the decoded image to be obtained finally (hereinafter this final decoded image is simply referred to as "the decoded image"). Therefore the other sub-bands may be regarded as zero or this LL sub-band image may be scaled up twice in x, y directions and output.

The simplifying unit may skip a process of that part of the image which corresponds to a low-order bit-plane of a low frequency component whenever the low frequency component to be decoded in an earlier decoding step is not completely decoded within the predetermined time. Namely, in the case of JPEG 2000, even when all parts of the LL sub-band cannot be decoded, the low-order bit-planes of the LL sub-band may be ignored.

The simplifying unit may conduct a normal decoding process on a frame which is being decoded at the moment when the playback of the motion picture, which is the purpose of the decoding, is stopped, and the simplified process is discontinued. If a user directs a stop or pause of the playback, the last frame to be displayed may be given plenty of decoding time.

According to still another aspect of the present invention, an image decoding apparatus is provided. The apparatus comprises a shooting block, a block which controls the shooting block mechanically, and a processing block which processes a digital image obtained by the shooting block. The processing block comprises a decoding unit which decodes a coded image generated from the digital image, and a simplifying unit which switches an ensuing part of a decoding process on any frame included in the coded image to a simplified process whenever the said frame is not completely decoded within a predetermined time.

According to still another aspect of the present invention, an image decoding apparatus is provided. The apparatus comprises a receiving block which receives a signal, a processing block which processes the received signal, and a playback block which plays back the processed signal. The processing block comprises a decoding unit which decodes a coded image which comprises a digital image extracted from the received signal, and a simplifying unit which switches an ensuing part of the decoding process on any frame included in the coded image to a simplified process whenever the said frame is not completely decoded within a predetermined time.

Moreover, any arbitrary replacement or substitution of the above-described structural components and the steps, expressions replaced or substituted in part or whole between a method and an apparatus as well as addition thereof, and expressions changed to a system, a computer program, a data structure, recording medium or the like are all effective as and are encompassed by the present invention.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but to exemplify the invention. The below embodiments relate to apparatus for decoding image data coded by JPEG 2000.

Figure 1:
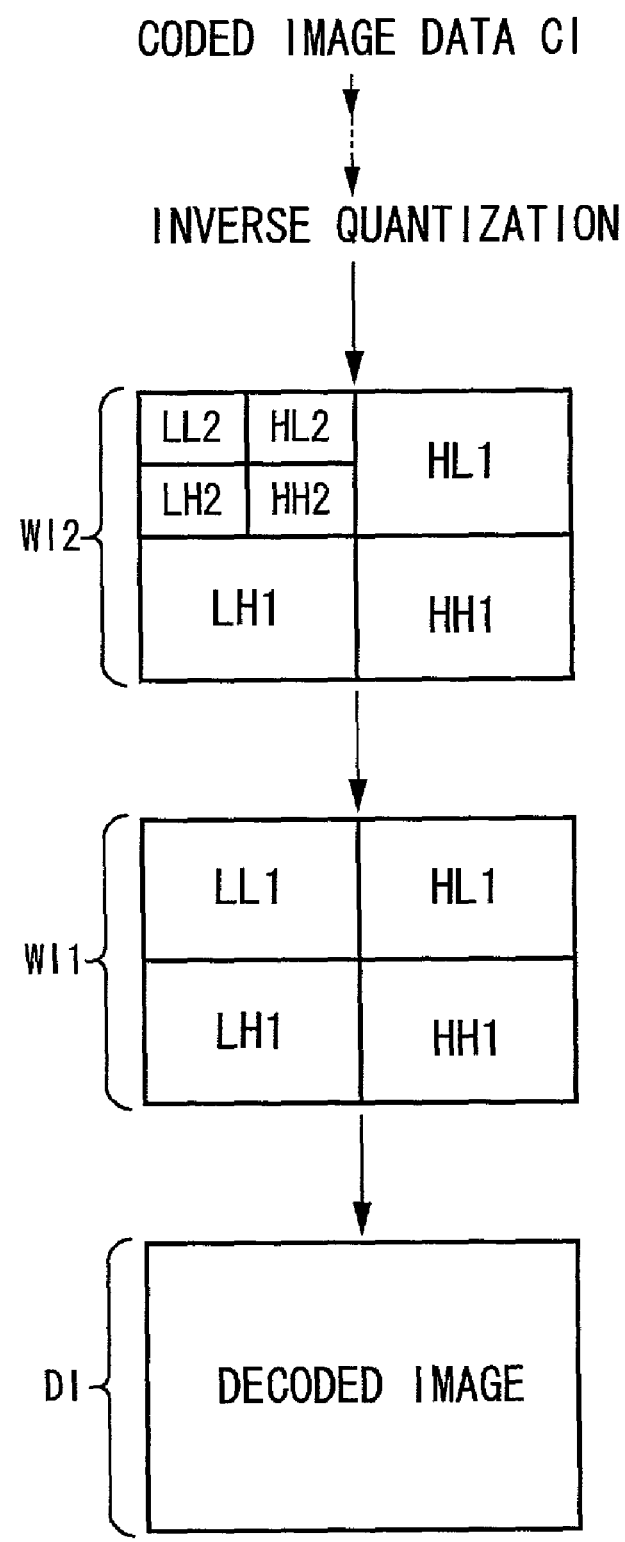
FIG. 1 shows a procedure of JPEG 2000 by which coded image data are decoded.

FIG. 1 illustrates a decoding process based on JPEG 2000. As shown in the figure, a coded image CI is first input and processed by an arithmetic decoding, bit-plane decoding and so forth as described later and then processed by an inverse quantization. In this stage, an image, which is generated after a wavelet transform is conducted twice on an original image, hereinafter referred to as the second layer image WI2, is obtained. Thereafter this image is processed by a wavelet inverse transform and the first layer image WI1 is generated. This image is then processed again by the wavelet inverse transform and then a decoded image DI is obtained.

Now a coding procedure is presented for ease of understanding. The coding can be regarded as an inverse transform of the process of FIG. 1. Namely, the decoded image DI of FIG. 1 corresponds to an original image and a wavelet transform is conducted once and thereby the first layer image WI1 is generated. The filter of the wavelet transform employed in JPEG 2000 is a Daubechies filter and the essence is that the filter simultaneously works as a low-pass filter and a high-pass filter in x, y directions of the image. Therefore it divides the original image into four frequency sub-bands: the LL sub-band which is composed of low frequency components in x and y directions, the HL and LH sub-bands which are composed of low frequency components in one of the x and y directions and high frequency components in the other direction, the HH sub-band which is composed of high frequency components in x and y directions. This filter also has a function of reducing the number of pixels comprising the image to half in x, y directions respectively. Thus the four sub-band images are generated, as illustrated in FIG. 1 (herein denoted by LL1, HL1, LH1, and HH1).

In the wavelet transform for coding, the filtering is conducted a predetermined number of times. In the case of FIG. 1, the wavelet transform is conducted twice and the second layer image WI2 is generated. The second wavelet transform and any subsequent wavelet transforms are conducted on the LL sub-band component of the previous layer image. Thus the LL1 sub-band of the first layer image Wi1 is divided into four sub-bands: LL2, HL2, LH2, and HH2. In the coding process, the image is processed by a quantization and others and then finally the coded image data CI are obtained.

It is to be noted that a low frequency component of the original image appears at the upper left in the hierarchized image. In the case of FIG. 1, the LL2 sub-band at the upper left corner of the second layer image WI2 comprises the lowest frequency components, and in other words, with this LL2 sub-band the basic nature of the original image can be reconstructed. This factor is employed in the following embodiments.

Figure 2:
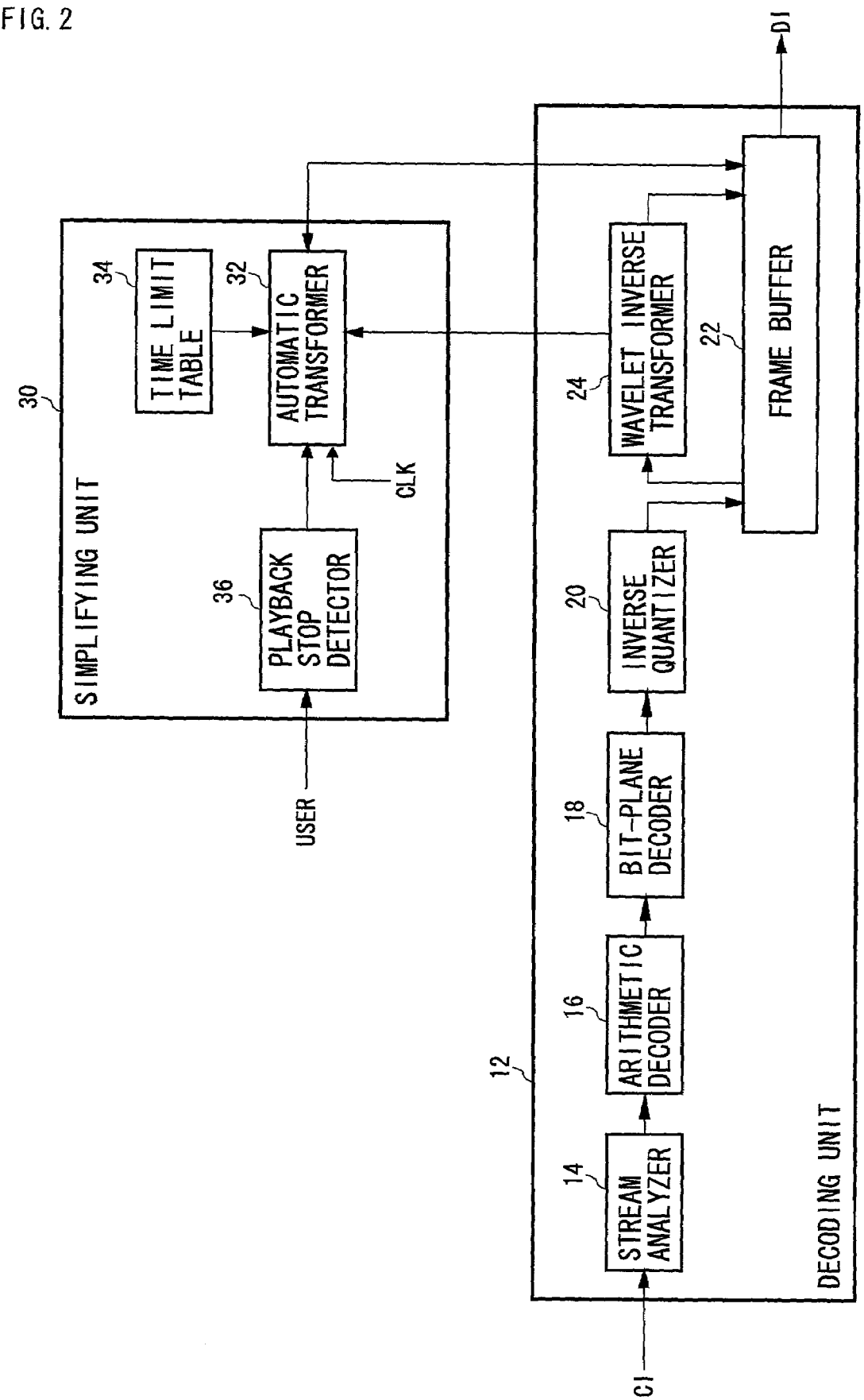
FIG. 2 is a block diagram of an image decoding apparatus according to one embodiment.

FIG. 2 shows the configuration of an image decoding apparatus 10. The image decoding apparatus 10 may be a normal computer and comprises a CPU, memory and program modules to decode images loaded in the memory. The blocks in FIG. 2 depict functions characteristic of the present embodiment and those skilled in the art understand the functional blocks can be embodied as hardware only, software only or any combination of the two.

The image decoding apparatus 10 mainly comprises a decoding unit 12 and a simplifying unit 30. The decoding unit 12 comprises a stream analyzer 14 which receives coded image data CI and analyzes the data stream, an arithmetic decoder 16 which conducts an arithmetic decoding on the sequence of the data which turned out to be decoded as a result of the analysis, a bit-plane decoder 18 which decodes each color component of the data obtained thereby in a bit-plane form, and an inverse quantizer 20 which conducts an inverse quantization on the resultant data, and a wavelet inverse transformer 24 which conducts a wavelet inverse transform on the n-th layer image WIn obtained by means of the inverse quantization. The wavelet inverse transformer 24 uses a frame buffer 22 as a work area. A decoded image DI obtained when the decoding is finally completed is output from the frame buffer 22 for any required purpose.

In addition, the simplifying unit 30 includes an automatic transformer 32 which monitors the decoding process and automatically switches a later part of the decoding process to a simplified process when the elapsed time exceeds a predetermined time limit, a time limit table 34 which stores a time limit to be referred to by the automatic transformer 32, and a playback stop detector 36 which detects whether a user directs to stop the playback of a motion picture. When the user indicates pause or stop during the playback of a motion picture, the decoded and played frame is actually at that moment released from the decoding time limit function. Therefore, when the playback stop detector 36 detects such an indication, the simplified process by the automatic transformer 32 is not activated and a normal decoding process and playback are conducted. It is to be noted that the automatic transformer 32 may have already initiated the simplified process and in such a case the remaining part of the decoding process may be conducted as normally as possible.

The automatic transformer 32 refers to a clock CLK to measure the elapsed time. The frequency of the clock CLK is divided inside the automatic transformer 32 and measured by means of a counter which is not shown in the figure so that a predetermined time is measured. It is to be noted that the automatic transformer 32 may refer to an external timing mechanism such as Programmable Interrupt Timer (PIT) and so forth, instead of using the clock CLK. Although the automatic transformer 32 herein monitors the progress of the process by the wavelet inverse transformer 24, it may monitor the elapsed time of the process in any stage from the stream analyzer 14 toward the wavelet inverse transform 24. In the following, for the sake of simplicity, such possible processes to be monitored are represented by the term "decoding process".

Figures 3, 4A, 4B, 4C:
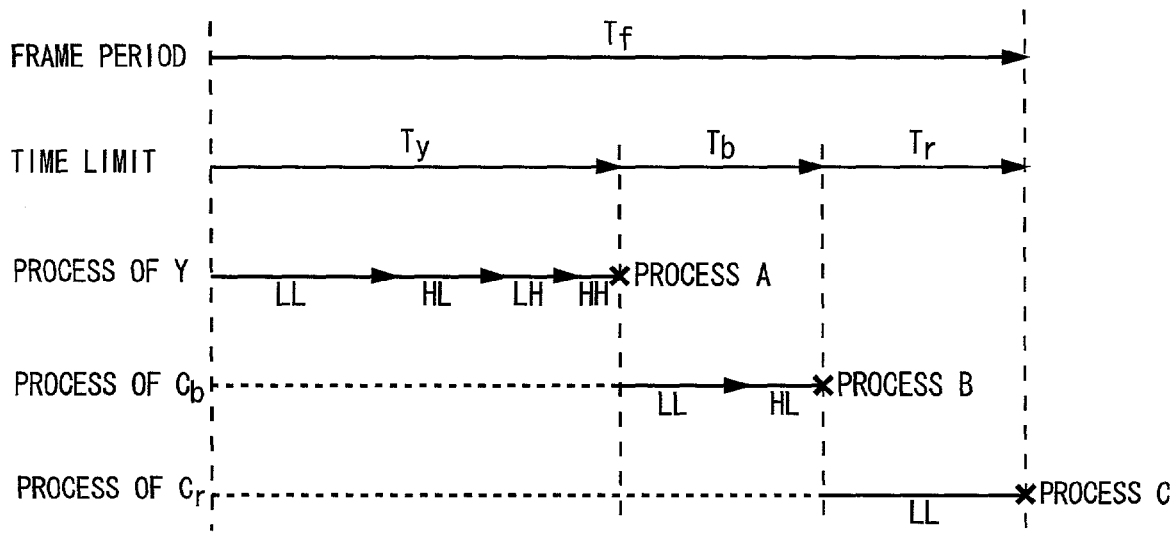
FIG. 3 shows the relationship between a frame period, a time limit and an actual decoding process in the embodiment.
FIGS. 4a, 4b and 4c show a simplified process conducted by a simplifying unit.

FIG. 3 shows the relationship between the time limit and the elapsed time at each step of the decoding process, and the simplified process to be initiated. As in the figure, a frame period Tf is set to ¼24 or ⅓0 second, for example, in the case of decoding a motion picture. Three time limits are set, depending on the process steps. The decoding of JPEG 2000 processes luminance Y and chrominance Cb, Cr independently, which are color components. In the figure, the time limits on decoding are defined as Ty for the luminance Y, Tb for the chrominance Cb, and Tr for the chrominance Cr. These time limits are stored beforehand in the time limit table 34. Defining the time limit for each of the color components prevents an unnatural image from being restored, for instance, one in which only one color component is decoded and in which the other color components are not decoded at all. The ratio of the time limits may be set on the basis of the ratio of the average times necessary for each of the process steps. A larger value of the time limit may be set for an important color component, for instance the luminance Y. Any value can be set on the time limit, according to experimental results.

In JPEG 2000, the decoding process is conducted in the sequence order of the LL, HL or LH, and HH sub-bands of the same layer image. Therefore, four sub-bands are first decoded in this order in respect of the luminance Y, and these four sub-bands are then decoded in respect of the chrominance Cb and Cr respectively.

If the processing of the three sub-bands LL, HL, LH is normally completed in the process of decoding the luminance Y, but the elapsed time nevertheless exceeds the time limit Ty during the processing of the last sub-band HH: in this case, the decoding process for the luminance Y is interrupted and switched to the simplified process denoted by "process A". Next, the decoding process for the chrominance Cb starts. If the decoding process of the LL sub-band is completed in the normal way, however, the elapsed time exceeds the time limit Tb during the process of decoding the following HL sub-band: in this case, the decoding process for the chrominance Cb is interrupted and switched to the simplified process denoted by "process B". Then the decoding process for the chrominance Cr starts. If the elapsed time exceeds the time limit Tr during the processing of the first sub-band LL in this decoding process: in this case, the decoding process is interrupted and switched to the simplified process denoted by "process C". The automatic transformer 32 compares the actual elapsed time with the time limit for each of the decoding processes and initiates the processes A, B and C, as appropriate.

FIGS. 4a, 4b and 4c illustrate respectively the processes A, B and C conducted by the automatic transformer 32. As shown in FIG. 4a, the automatic transformer 32 invalidates the coefficients of the HH sub-band, the processing of which is thus canceled during the decoding. Namely, all the components of the HH sub-band are replaced by zero. The automatic transformer 32 works in cooperation with the wavelet inverse transformer 24 for this purpose so that the automatic transformer 32 can store "zero" into the region where the wavelet inverse transformer 24 would originally have stored the components of the HH sub-band after the inverse transform. By means of this simplified process, the process of decoding the luminance Y can be conducted within the time limit Ty and the degradation of image quality can be minimized by exploiting the fact that the human eye is not very sensitive to high frequency components.

FIG. 4b shows the simplified process conducted as the process B by the automatic transformer 32. As in the figure, only the sub-band LL is normally decoded in the decoding process for the chrominance Cb. For this reason, all the components of the other three sub-bands are invalidated and replaced with zero as shown in the figure. In this case the purpose is also to preserve the low frequency components. In general, the filter of the wavelet transform adopted in JPEG 2000 is designed to maintain the image quality in a low bit rate so that an image of relatively high quality can be obtained in the playback of the image by using the LL sub-band only. This characteristic is herein utilized.

FIG. 4c shows the simplified process C as conducted by the automatic transformer 32. In the process of the chrominance Cr, not even the first sub-band LL is completed. For this reason, as denoted by LL' in the figure, a process is conducted on the data of the LL sub-band. In more concrete terms, the processing of the low-order bit-planes of a plurality of bit-planes, which compose the LL sub-band, is skipped so that the processing time can be shortened.

Figure 5A:
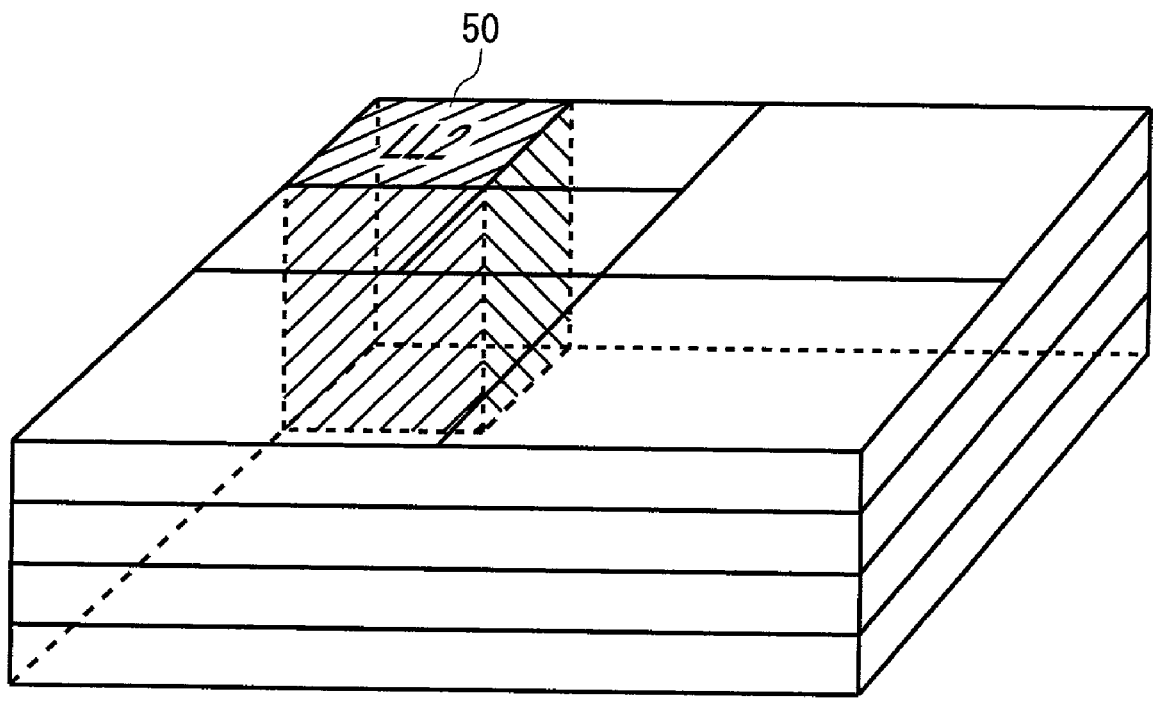
FIGS. 5a and 5b show the relationship between an LL sub-band and bit-planes in a layer in JPEG 2000.

FIG. 5a shows the relationship between the sub-band LL2 in the second layer WI2 and the bit-planes. As shown in the figure, in the second layer image WI2, the sub-band LL2 is first decoded across all the bit-planes, as denoted by the rectangular solid 50. Therefore if the bit-planes close to the least significance bit (LSB) are skipped, the processing time can be shortened while degradation of the image quality is minimized.

Figure 5B:
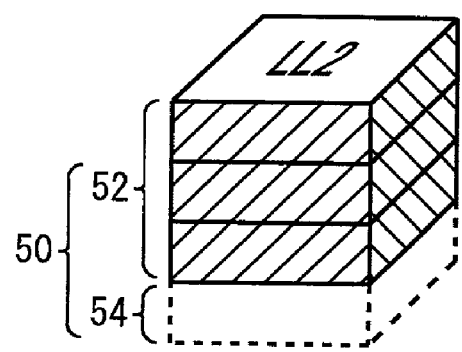

As shown in FIG. 5b, the rectangular solid 50 is divided into the part 52 that is composed of the valid bit-planes and the part 54 to be skipped. Here the lowest bit-plane is discarded in relation to the time limit Tr.

As described above, owing to the simplified process performed by the simplifying unit 30, especially the automatic transformer 32, one frame can be restored at each frame period Tf and a motion picture or images continuously shot can be played back without frame drop. At the same time, a relatively natural image can be obtained because degradation of the image quality is carefully prevented. Furthermore, since a time limit is allocated for each of the color components, it is unlikely that color imbalance between the frames will occur. Therefore, according to the present embodiment, in practice, very large advantages can be produced with a relatively small-scale configuration.

Figure 6:
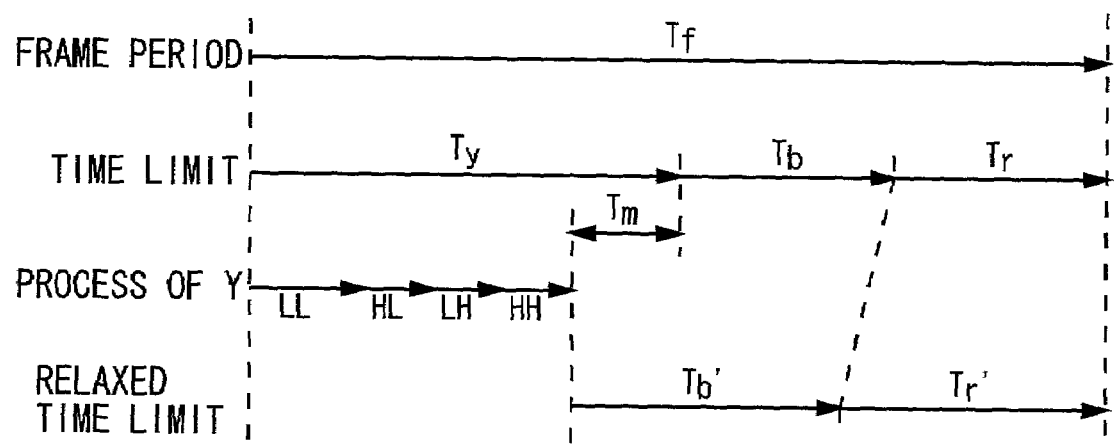
FIG. 6 shows how the time limits of other decoding steps are rescheduled when a temporal space is produced in one decoding step in the embodiment.

The case in which the elapsed time exceeds the time limit during the process of decoding the image has been considered above, however, by way of contrast, the time limit may be left on, depending on conditions. FIG. 6 shows how the time limit is rescheduled in such a situation.

In the figure, the frame period Tf is the same as that of FIG. 3 and the three time limits Ty, Tb and Tr are also the same as those of FIG. 3. If the decoding process for the luminance Y starts and all of the four sub-bands LL, HL, LH, HH are completed within the time limit Ty: in this case, a temporal space Tm for the time limit Ty is left as shown in the figure. This temporal space Tm can be used in the decoding processes for the chrominance Cb and Cr. Therefore, as shown in the figure, the time limits Tb and Tr for the chrominance Cb and Cr are relaxed and changed to the longer time limits Tb' and Tr' respectively.

According to this method, if the decoding process for one color component is completed, a temporal space can be produced and used for the decoding process of other color components as an effect, resulting in an increase in the number of the color components which are completely decoded. Therefore image quality can be enhanced while color balance is maintained.

If all the three color components or any one of the components are decoded within the time limit, the whole decoding time for this frame might be shorter than the originally defined frame period Tf. In this case a similar rescheduling method can be applied between the frames. Namely if there is any temporal space when one frame is decoded, this temporal space can be added to the next frame period Tf. According to this method, more frames can be restored completely or with a higher image quality. Moreover, according to this embodiment, a desired image can be played at low cost and with low power consumption without any excessive load on the image decoding apparatus 10.

Figure 7:
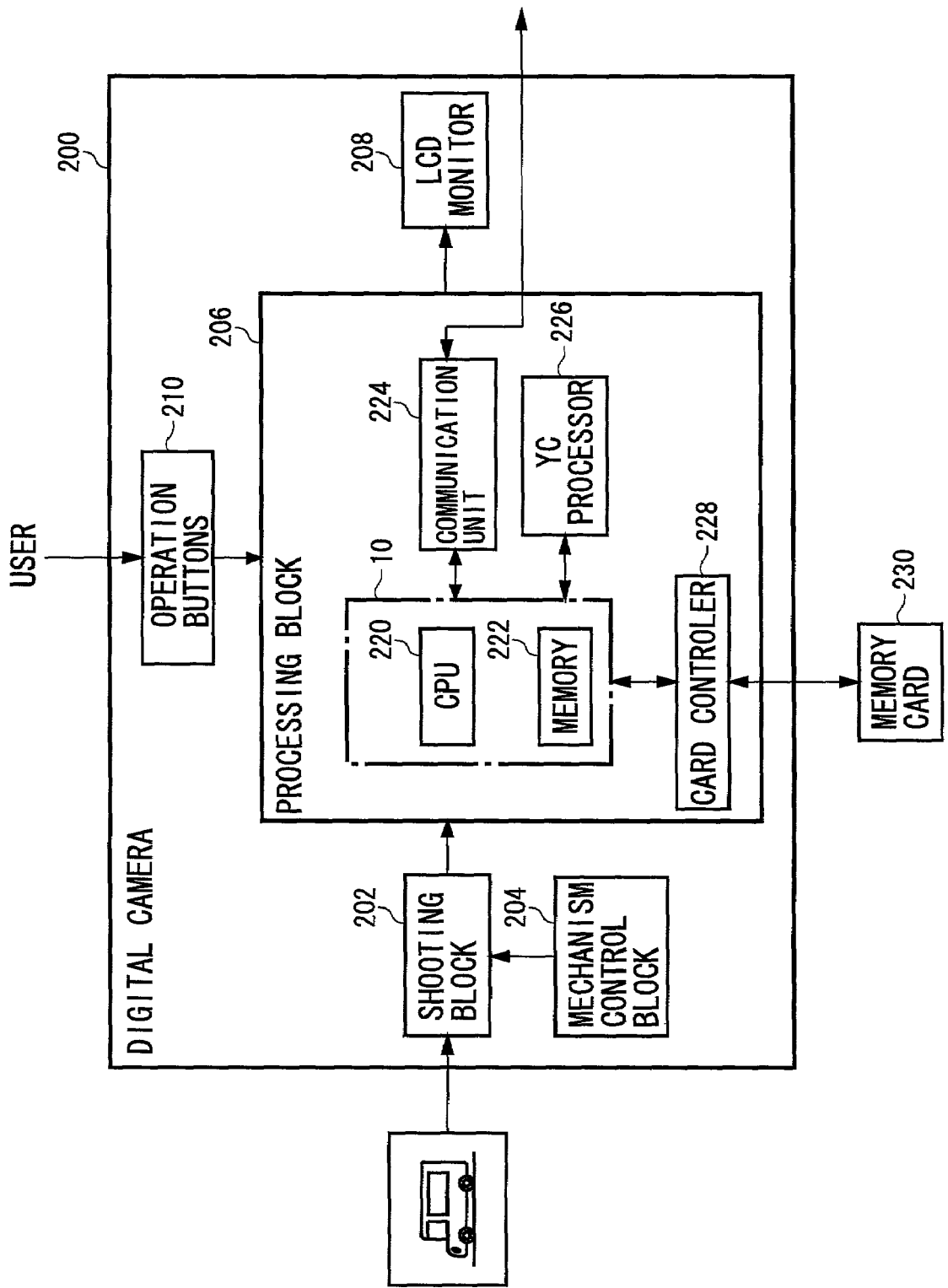
FIG. 7 is a block diagram of a digital camera according to another embodiment.

FIG. 7 shows the configuration of a digital camera 200 according to another embodiment. The digital camera 200 comprises a shooting block 202, a mechanism control block 204, a processing block 206, an LCD monitor 208 and operation buttons 210.

The shooting block 202 comprises a lens, a lens stop, an optical low-pass filter (LPF), a CCD and a signal processor (not shown). The CCD accumulates charge according to the amount of light received from an object imaged on the light receiving plane of the CCD. The charge is read as a voltage signal, which is decomposed into R, G and B components in the signal processor. The components are subjected to white balance adjustment and gamma correction. The R, G and B signals are then input into an A/D converter from which digital image data are output to the processing block 206.

The mechanism control block 204 controls the optical system including the zooming, focusing and iris of the shooting block 202. The processing block 206 comprises a CPU 220, memory 222, a YC processor 226, a ca rd controller 228 and a communication unit 224. The image decoding apparatus 10 of FIG. 2 is realized with some of the functions of the CPU 220, and an image decoding program loaded in the memory 222. The frame buffer 22 of FIG. 2 is realized using part of the memory 222. It is to be noted that an image coding apparatus not shown in the figure is also realized using the CPU 220 and the memory 222 so that this digital camera 200 can save image data into a memory card 230. Therefore the configuration by which both image coding and decoding can be conducted is explained below.

From the digital image data the YC processor 226 generates luminance Y, chrominance Cb and Cr. The luminance and chrominance are coded separately and sequentially. The coded image data CI are output via the communication unit 224 or are written into the memory card 230 via the card controller 228.

The communication unit 224 conducts a protocol transform in accordance with a standardized communication specification. The communication unit 224 may transmit data from and to a printer, a game player and other external devices via respective interfaces.

The LCD monitor 208 displays a motion picture, images from a high-speed continuous shoot and still images as well as shooting/replay mode, zoom ratio, date and so on. Therefore, when a user shoots a motion picture, the picture is first compressed and recorded into the memory card 230, for instance. When the user plays back the motion picture, the simplified process characteristic of the embodiment is conducted if necessary. The operation buttons 210 may include a power switch, a release switch and so on to shoot a picture or to set operational modes.

The above-mentioned configuration has the following effects.

1. When a still image is shot and played back, there is technically no time limit set on the decoding process. Therefore the decoding is not simplified and the image is restored with the highest image quality. However, since too long a decoding time might give rise to problems with even a still image, the simplified process characteristic of this embodiment may be conducted in this case.

2. When a motion picture is shot and played back, the simplified process is conducted depending on conditions, because its frame rate must be maintained. Therefore, even if the image decoding apparatus 10 is not highly speeded up, the image quality can be maintained and frame drop can be prevented. Since a high specification is not required for the image decoding apparatus 10, advantages in cost and power consumption can be gained.

3. When stop or pause is indicated during the playback of a motion picture, the simplified process is not conducted on the last frame and its image quality becomes the highest or close to the highest possible. In particular, since a user will look at this frame as virtually a still image for a relatively long time, there may be great advantage in this function.

Figure 8:
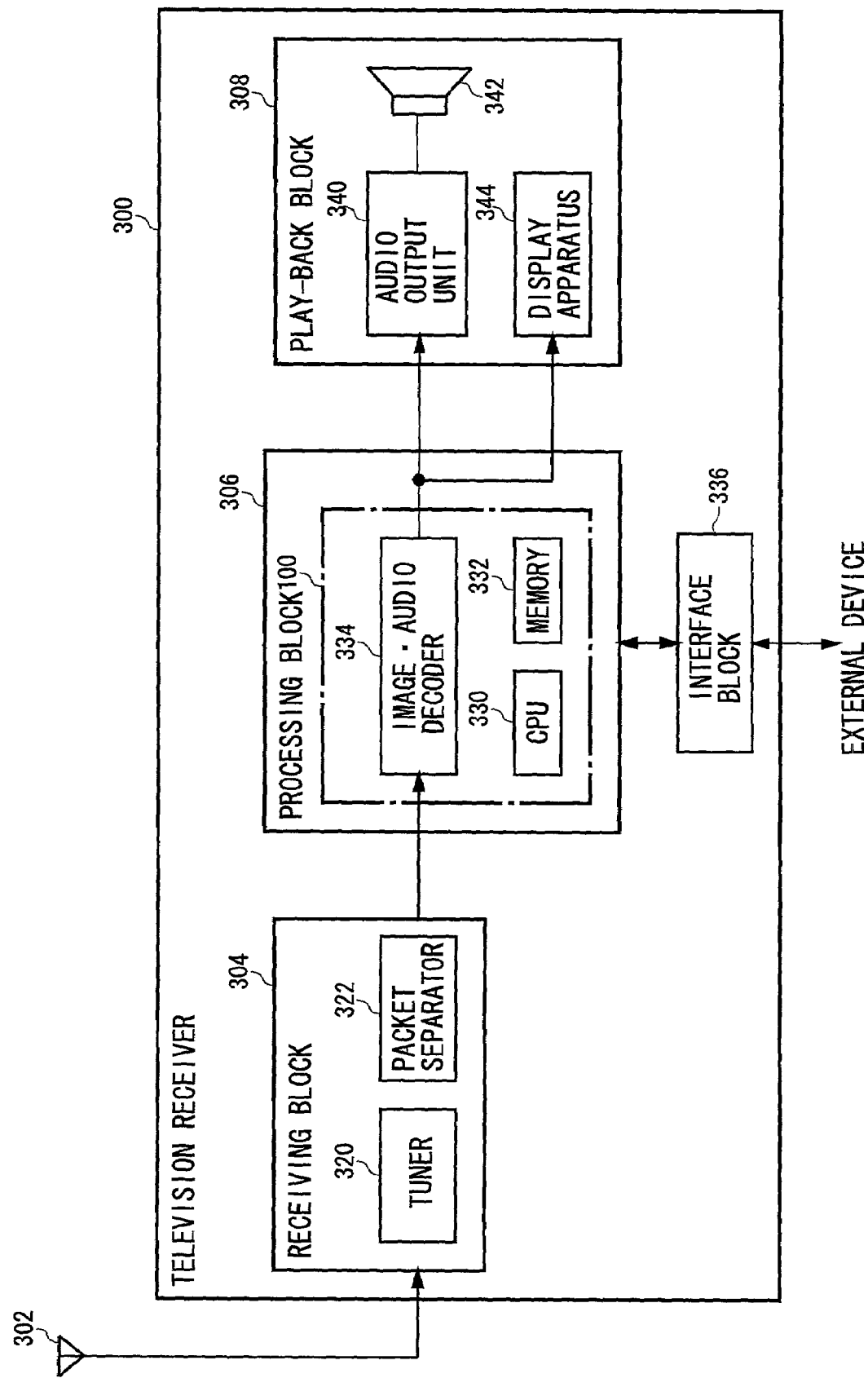
FIG. 8 is a block diagram of a television receiver according to yet another embodiment.

FIG. 8 shows the configuration of a television receiver 300 according to yet another embodiment. The television receiver 300 includes an antenna 302, a receiving block 304 which receives a broadcast wave via the antenna 302, a processing block 306 which processes image and audio data obtained through the process applied by the receiving block 304, and a play-back block 308 which plays the audio and image data decoded by the processing block 306. An interface block 336 outputs the image data decoded by the processing block 306 to an appropriate external device.

The receiving block 304 includes a tuner 320 and a packet separator 322. The tuner 320 selects a transponder which includes a channel selected by a user and conducts a QPSK demodulation. A stream which includes a plurality of transport packets obtained in the demodulation is forwarded to the packet separator 322. The packet separator 322 is a demultiplexer and it separates a packet corresponding to a desired channel and outputs this to the processing block 306.

An image and audio decoder 334 in the processing block 306 works in cooperation with a CPU 330 and a memory 332 and thus decodes the image and audio data which are coded and transmitted by a broadcasting station. The image and audio decoder 334 decodes an input packet and outputs audio data to an audio output unit 340 and image data to a display apparatus 344. The audio output unit 340 conducts a predetermined process on the input audio data and finally audio is output to a speaker 342. That part of the configuration of the processing block 306, that comprises the image and audio decoder 334, the CPU 330, and the memory 332, which relates to the image decoding, corresponds to the image decoding apparatus 10 of FIG. 2. The above-mentioned configuration can realize a so-called digital TV set at very low cost and with low power consumption. This TV set can be incorporated into a small-sized device such as a mobile phone.

Although the present invention has been described by way of exemplary embodiments, it should be understood that many changes and substitutions may be made by those skilled in the art without departing from the spirit and the scope of the present invention which is defined only by the appended claims. Such changes and substitutions may be provided as follows.

The process B of FIG. 4b invalidates all the components of the three sub-bands except the LL sub-band. However, as another method, the components other than the LL sub-band may be left indefinite and the LL sub-band may simply be scaled up twice in x, y directions. In this case an interpolation process between pixels may be conducted, however, if the filter used for this purpose has the same characteristics as that used in the wavelet inverse transform of JPEG 2000, the same image can be obtained as in the case in which the components of the three sub-bands are invalidated.

In the embodiments, a time limit is allocated for each component. The time limit, however, may be allocated according to other image attributes. For instance, if the image is divided into a plurality of regions and the decoding process is conducted on each of the regions, a time limit may be allocated for each of the different regions. In this case, the time limit may be allocated in proportion to the dimension of the region. A relatively long time may be allocated to a preeminent region of the image, for instance, a region with high luminance. A relatively long time may also be allocated to a region with a large amount of movement, for instance, a region which has large motion vector components. A longer time may be allocated to a region of high importance as an object, for instance, the region of a human face on a TV phone. Such allocation may be considered in various ways. Moreover, it is possible to divide the image into tiles beforehand in JPEG 2000 and in this case the time limit may be allocated to each of the tiles in a similar manner. In this case, if the process of one region is completed within the time limit, the time limit of the other regions may consequently be rescheduled likewise. In FIG. 4c the processing of the low-order bit-planes of the LL sub-band is omitted. As another method, the LL sub-band of a previously decoded layer may be utilized. For instance, if the decoding process for the sub-band LL1 of the first layer image WI1 of FIG. 1 is not completed, the sub-band LL2 of the second layer image WI2, which is a previous layer, may be enlarged and utilized.

In FIG. 4c, the processing of the low-order bit-planes of the LL sub-band is omitted so that the processing time can be shortened. As another decoding method, the process of four sub-bands may be conducted on a bit-plane basis starting from the highest bit-plane in order of the bit-plane layers. Namely, after the process is conducted in the sequence order of the LL, HL or LH, and HH sub-bands on one bit-plane, the process is conducted in the same order on another lower-order bit-plane. In this decoding method, if the time limit is exceeded, the processing of the low-order bit-planes that are not yet processed may be omitted and thereby the decoding process can be simplified. Unlike the case shown in FIGS. 5a and 5b, the processing of the low-order bit-planes is omitted on the whole four sub-bands in this case.

What is claimed is:

1. A method for decoding a coded image, comprising, when a coded image frame is presumed not to be entirely decoded within a predetermined time, changing a decoding parameter to simplify an ensuing part of a decoding process of the coded image frame itself.

2. A method for decoding a coded image, wherein the coded image is a motion picture coded on a frame basis, comprising, when a frame included in the coded image is presumed during a decoding process not to be entirely decoded within a predetermined time, changing a decoding parameter to simplify an ensuing part of the decoding process of the frame.

3. The method of claim 2, further comprising dividing the decoding process of the frame into a plurality of steps and defining a time limit for each of the steps, and wherein when an elapsed time reaches the defined time limit at any one of the steps, the ensuing part of the processing of the step is simplified.

4. The method of claim 3, comprising relaxing the time limit allocated to a remaining step when any one of the steps is completed within its time limit.

5. The method of claim 2, wherein the coded image is a motion picture in which the frames are coded independently of each other and the simplified process is a process confined within each of the frames.

6. An image decoding apparatus comprising:
a decoding unit which decodes a coded image; and
a simplifying unit which, when a coded image frame is presumed not to be entirely decoded within a predetermined time, changes a decoding parameter to simplify an ensuing part of a decoding process of the coded image frame itself.

7. The apparatus of claim 6, wherein the simplifying unit conducts the simplified process by automatically setting a high frequency component of the image to zero.

8. The apparatus of claim 7, wherein the simplifying unit adjusts a resolution of a decoded image, which has a low frequency component as a basic component after the high frequency component is automatically set to zero, when the decoded image does not have a desired level of resolution.

9. An image decoding apparatus comprising:
a decoding unit which decodes a coded image; and
a simplifying unit which switches an ensuing part of a decoding process to a simplified process whenever the coded image is not completely decoded within a predetermined time,
wherein the simplifying unit skips a processing of a part of the image which corresponds to a low-order bit-plane of a low frequency component whenever the low frequency component to be decoded in an earlier decoding step is not completely decoded within the predetermined time.

10. The apparatus of claim 6, wherein the simplifying unit conducts the simplified process by skipping a processing of a low-order bit-plane of the image.

11. An image decoding apparatus comprising:
a decoding unit which decodes a coded image which is a motion picture coded on a frame basis; and
a simplifying unit which, when a frame included in the coded image is presumed during a decoding process not to be entirely decoded within a predetermined time, changes a decoding parameter to simplify an ensuing part of the decoding process by the decoding unit of the frame.

12. The apparatus of claim 11, wherein the simplifying unit compares a time limit defined for each of a plurality of frame-decoding steps to an elapsed time at each of the steps, and simplifies an ensuing process of any one of the steps in which the elapsed time reaches the time limit.

13. The apparatus of claim 12, wherein the simplifying unit conducts the comparison of the time limit and the elapsed time and activates the simplified process if necessary at the step of decoding each of a plurality of color components which compose the image.

14. The apparatus of claim 12, wherein the simplifying unit conducts the comparison of the time limit and the elapsed time and activates the simplified process if necessary at the step of decoding each of a plurality of regions which compose the image.

15. The apparatus of claim 12, wherein the simplifying unit relaxes the time limit allocated to a remaining step when any one of the steps is completed within its time limit.

16. The apparatus of claim 11, wherein the simplifying unit relaxes the predetermined time allocated to the next frame to be decoded when the decoding process of any one of the frames is completed earlier.

17. The apparatus of claim 11, wherein the simplifying unit conducts the simplified process by automatically setting a high frequency component of the image to zero.

18. The apparatus of claim 17, wherein the simplifying unit adjusts a resolution of a decoded image, which has a low frequency component as a basic component after the high frequency component is automatically set to zero, when the decoded image does not have a desired level of the resolution.

19. An image decoding apparatus comprising:
a decoding unit which decodes a coded image which is a motion picture coded on a frame basis; and
a simplifying unit which switches an ensuing part of a decoding process on any frame included in the coded image to a simplified process whenever the frame is not completely decoded within a predetermined time,
wherein the simplifying unit skips a processing of a part of the image which corresponds to a low-order bit-plane of a low frequency component whenever the low frequency component to be decoded in an earlier decoding step is not completely decoded within the predetermined time.

20. The apparatus of claim 11, wherein the simplifying unit conducts the simplified process by skipping a processing of a low-order bit-plane of the image.

21. The apparatus of claim 11, wherein the simplifying unit conducts a normal decoding process on a frame which is being decoded at a moment when a playback of the motion picture is stopped, instead of continuing the simplified process.

22. The apparatus of claim 11, wherein the coded image is a motion picture in which the frames are coded independently of each other and the simplifying unit conducts the simplified process confined within each of the frames.

23. An image decoding apparatus comprising:
   a shooting block;
   a block which controls the shooting block mechanically; and
   a processing block which processes a digital image obtained by the shooting block,
   wherein the processing block comprises:
   a decoding unit which decodes a coded image generated from the digital image; and
   a simplifying unit which, when a frame included in the coded image is presumed during a decoding process not to be entirely decoded within a predetermined time, changes a decoding parameter to simplify an ensuing part of the decoding process by the decoding unit of the frame.

24. An image decoding apparatus comprising:
   a receiving block which receives a signal;
   a processing block which processes the received signal; and
   a playback block which plays back the processed signal,
   wherein the processing block comprises:
   a decoding unit which decodes a coded image which comprises a digital image extracted from the received signal; and
   a simplifying unit which, when a frame included in the coded image is presumed during a decoding process not to be entirely decoded within a predetermined time, changes a decoding parameter to simplify an ensuing part of the decoding process by the decoding unit of the frame.

* * * * *